Aug. 24, 1926.                                      1,597,366
O. F. LUNDELIUS
DIFFERENTIAL MOUNTING
Filed Dec. 3, 1923

Inventor.
Oscar Frederick Lundelius
by
his Attorney.

Patented Aug. 24, 1926.

1,597,366

UNITED STATES PATENT OFFICE.

OSCAR FREDERICK LUNDELIUS, OF LOS ANGELES, CALIFORNIA, ASSIGNOR, BY DIRECT AND MESNE ASSIGNMENTS, TO LUNDELIUS & ECCLESTON MOTORS CORPORATION, OF LAS VEGAS, NEVADA, A CORPORATION OF DELAWARE.

DIFFERENTIAL MOUNTING.

Application filed December 3, 1923. Serial No. 678,151.

This invention relates to mountings for power producing or transmitting elements of motor vehicles. While the mounting is not confined to any particular element, for the sake of brevity, I have limited most of the present showing and description to an application of the mounting wherein a differential casing or housing is the supported element. However, this limitation in the drawings and description is not to be considered as restrictive on the invention.

The invention is particularly adaptable to that type of vehicle wherein the differential is carried as sprung weight, as distinguished from the common run of vehicles wherein differentials are rigidly carried on rear axles as unsprung weight.

With differentials carried as unsprung weight, the vehicle body and differential are necessarily capable of relative vertical movement, and such movement occurs constantly during periods of vehicle operation, the extent of movement depending upon the relative weight of body and differential, resiliency of riding springs, and the severity of road conditions. Without going into detail, it may be said that the constant movement between body and differential imposes great strain upon these members, causes excessive wear on power plant and transmission elements, is destructive to running gear and tires, and generally reduces the useful life of the vehicle.

It is obvious that with the frame and differential rigidly connected and sprung from the wheels, the above mentioned objectionable features, as well as others, are eliminated. Axles are unnecesary, for the springs may be utilized as the sole connecting means between wheels and frame. However, in the absence of driving axles, special provision must be made for insuring a reliable connection between springs and frame, and for keeping the springs in proper relative position with respect to wheels and frame so the springs may function efficiently irrespective of driving or road conditions. Furthermore, as the spring connection necessarily allows limited vertical movement between frame and wheels, and hence between differential and wheels, there must be a flexible power transmitting connection between differential and wheels. The present invention provides a novel mounting for connecting frame, differential and springs, whereby all of the above mentioned requirements are most effectively fulfilled, and whereby full advantage may be taken of the sprung weight system of differential suspension. A full understanding of the device will be had from the following detailed description, reference being had to the accompanying drawings, in which:—

Figure 1:
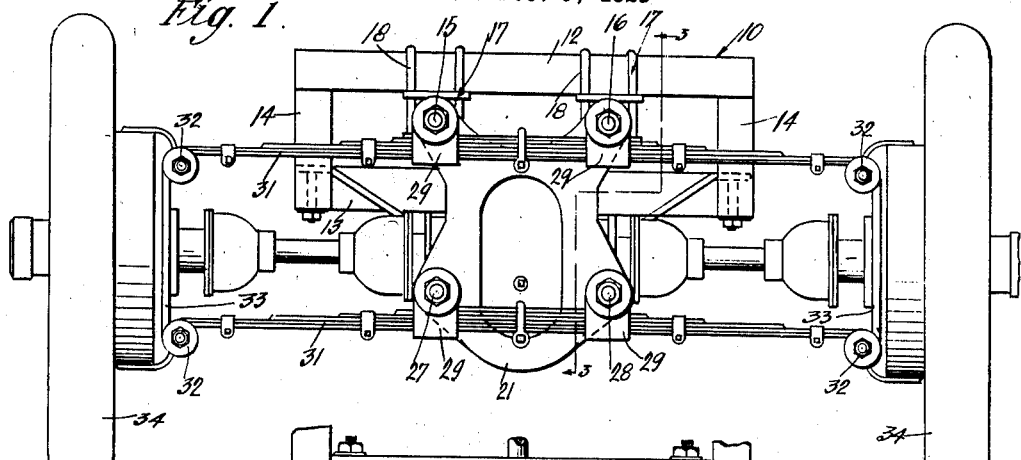
Figure 1 is a rear end view of a chassis showing my improved mounting attached thereto.

A vehicle frame is generally indicated at 10, the side rails 11, thereof, being joined by end rail 12 and cross bar 13. Preferably, end rail 12 is set above side rail 11 by uprights 14 in order to provide ample overhead clearance for the spring system and differential housing. Studs 15 and 16 are carried beneath end rail 12 by stud hangers 17 in substantial parallelism with side rails 11, each hanger being made up of U-bolts 18 and a two-part, longitudinally split clamp 19. By taking up nuts 20, clamp 19 engages its associated stud in a manner to hold it against rotative and longitudinal movement, the clamp being drawn against rail 12 in a manner to hold the stud in fixed position on said rail. Preferably hangers 17 are spaced equally from the center of rail 12.

Mounted on studs 15 and 16 and arranged on opposite sides of end rail 12, are suspension members or plates 21 and 22, held against longitudinal movement along the studs by such means as nuts 23 threaded on the studs. Suspension plates 24 and 25, which are adapted to support differential housing 26, are supported and positioned on studs 15 and 16 in a manner similar to that described in connection with the mounting of plates 21 and 22. Extending through and supported by plates 21, 22, 24 and 25, are the lower studs 27 and 28, these lower studs serving, as one of their purposes, to space the lower ends of said plates, and generally to add to the rigidity of the stud and plate structure.

Spring hangers 29 are pivotally mounted on all of the several studs, being held in proper position on said studs by nuts 23 and 30. Springs 31 are carried in hangers 29 and are pivotally connected at their extremities 32 with plates 33 which are adapted to support drive wheels 34, indirectly.

Figure 2:
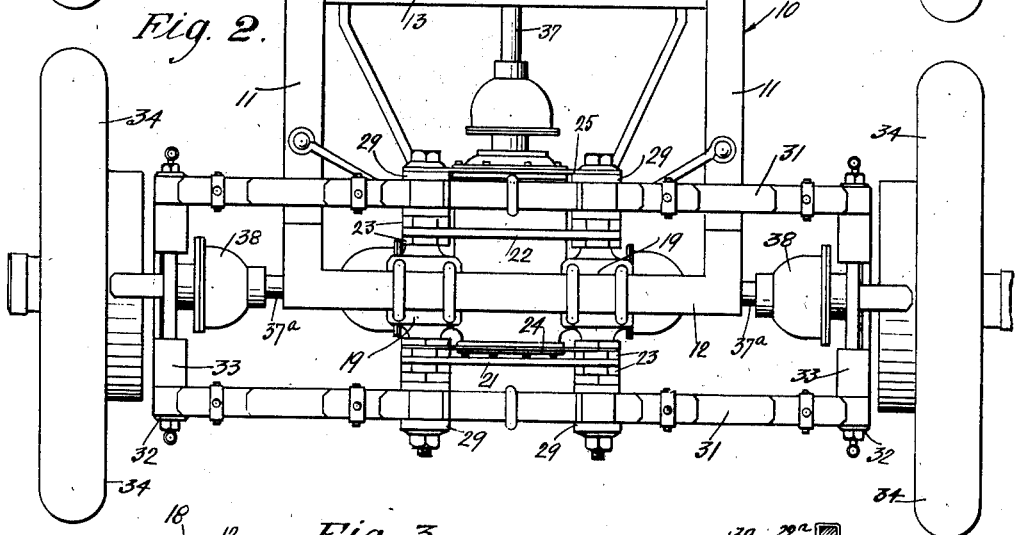
Fig. 2 is a top plan view of Figure 1.
Figure 3:
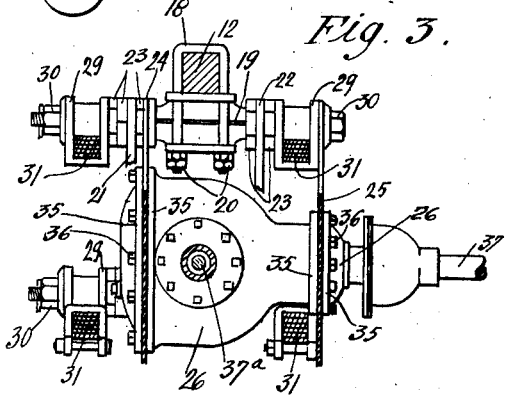
Fig. 3 is a section on the irregular line 3—3 of Figure 1.

The particular symmetrical arrangement of the studs and springs about vertical and horizontal axial planes, as illustrated in Figures 1 and 2, is not a limitation on the present invention, although the device lends itself particularly well to such a symmetrical arrangement, which is of importance in certain spring installations, for instance, in the spring system described and claimed in my copending application on balance vehicle spring, Serial No. 678,148, filed under even date herewith. Neither should it be considered that the means for attaching the individual springs to the studs are confined to the pivotal hangers shown in the present application, although these hangers and associated members may be used to particular advantage, as fully set forth in my copending application on vehicle springs, Serial No. 678,150, filed under even date herewith, wherein it is explained how increased flexibility is obtained through the use of such pivotal spring mountings. The structure disclosed in the present application is particularly advantageous in that it readily admits of such pivotal spring mounting.

By proper assembly, plates 21, 22, 24 and 25 may be secured on the studs so as to occupy different relative positions, their particular arrangement depending upon the nature of the structure to be supported by or between said plates. All of the plates are apertured to allow the extension therethrough of differential housing 26 or its associated parts. While any suitable means may be employed for securing housing 26 to plates 24 and 25, I have illustrated a preferred means in the drawings, wherein the opposed flanges 35 of separable housing members are clamped on opposite sides of plates 24 and 25 by bolts 36. Propeller shaft 37 extends from the differential mechanism (not shown) within housing 26 to the power plant of the vehicle, while driving shafts 37ᵃ extend laterally from the differential mechanism to driving wheels 34, there being universal joints 38 in the power transmission line whereby relative movement between wheels and differential is accommodated without undue loss of power.

In some instances I may dispense with plates 24 and 25 and mount the differential housing directly on either or both of suspension members 21, 22; and I may also substitute for individual plates 21, 22 and clamp 19, a single casting made up of laterally spaced plates and means for suspending the casting from the frame. In such a case, the spring hanger supporting studs may be separable from the casting but normally secured thereto in any suitable manner. Such variations as I have just mentioned (as well as others, lie within the scope of my broader claims.

From the above it will be seen that the differential housing is connected rigidly to, and moves as one with the frame, and that the differential is sprung, rather than rigid, with the wheel carrying members, which members, in the present instance, consist of plates 33, and, in the usual type of vehicle, would consist of an axle extending from wheel to wheel. By reason of the symmetrical arrangement of the studs and springs about substantially horizontal and vertical axial planes, strains arising from road shocks, traction, etc., are uniformly distributed through the mounting, whereby the mounting and associated structure are rendered stable and resist the forces of such shocks, etc.

Figure 4:
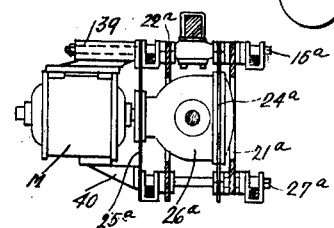
Fig. 4 illustrates a driving motor directly carried by the mounting.

As mentioned at the outset, the mounting may be utilized for supporting members other than the differential. To illustrate this, Figure 4 shows an electric motor M connected by bracket 39 and 40 to upper studs 15ᵃ and plate 25ᵃ, respectively, the motor being in direct operative connection with the differential mechanism within housing 26ᵃ. Figure 4 is merely a conventional showing, but serves to illustrate the adaptability of the mounting to a particular situation, wherein the power producing unit or prime mover is carried as sprung weight and in direct connection with the driving shaft. The engine of a steam propelled vehicle may be mounted in a manner similar to that of motor M.

While I have shown and described certain physical embodiments of my invention, I do not wish to be limited thereto except for such limitations as a fair interpretation of the appended claims may import.

I claim :—

1. A mounting for securing a driving element to a motor vehicle frame which is sprung from the vehicle wheels, embodying studs connected to the frame and supporting the vehicle springs, a suspension member supported and carried solely by the studs and thereby connected to the frame, and means for attaching said element to said suspension member.

2. In a mounting for securing a driving element to a motor vehicle frame which is sprung from the vehicle wheels, a clamp secured to the frame, studs supported by the clap and supporting the vehicle springs, a suspension member supported by the studs, and means for attaching the driving element to the suspension member.

3. In a mounting for securing a driving element to a motor vehicle frame which is sprung from the vehicle wheels, a clamp secured to the frame, a member supported intermediate its ends by the clamp, the vehicle springs being operatively connected to said member at opposite sides of said clamp, a suspension member carried by said first-mentioned member, and means for attaching the driving element to said suspension member.

In witness that I claim the foregoing I have hereunto subscribed my name this 17th day of November 1923.

OSCAR FREDERICK LUNDELIUS.